UNITED STATES PATENT OFFICE.

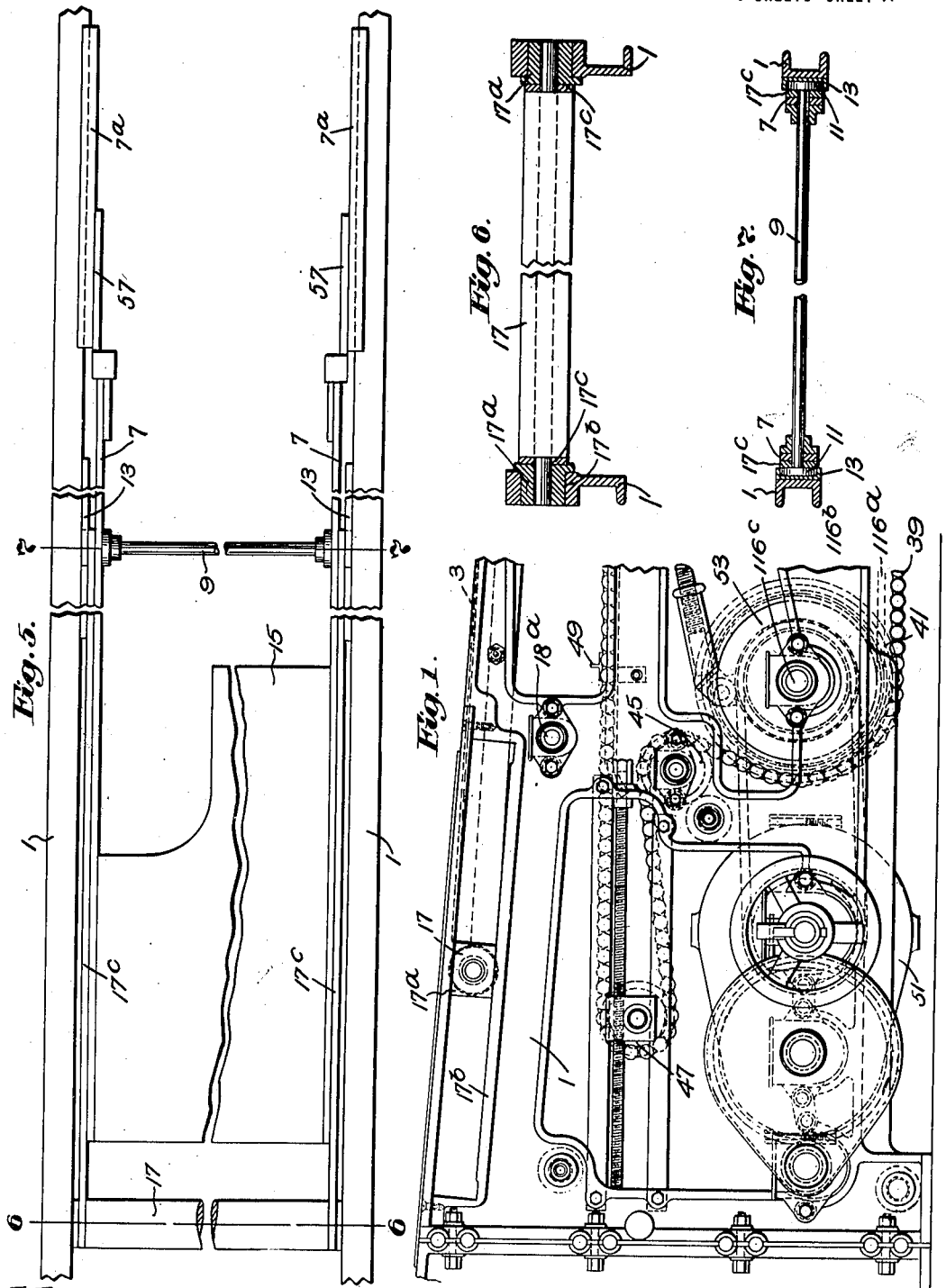

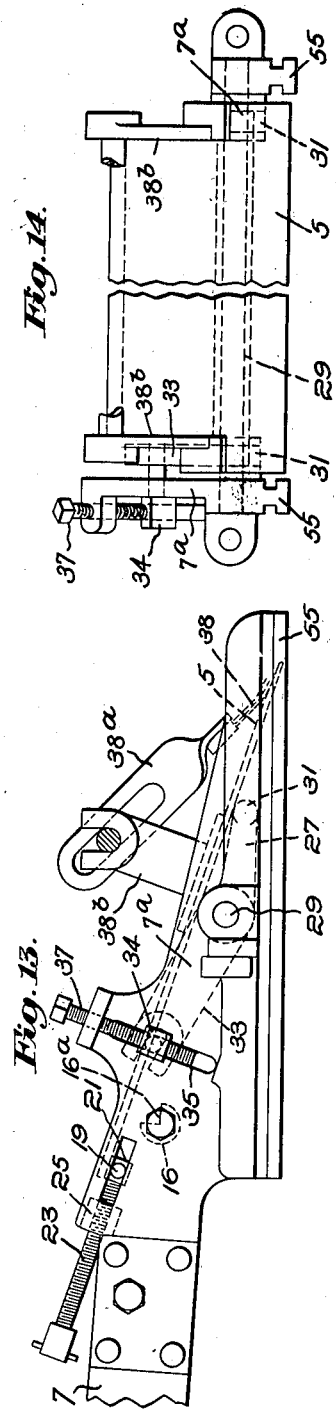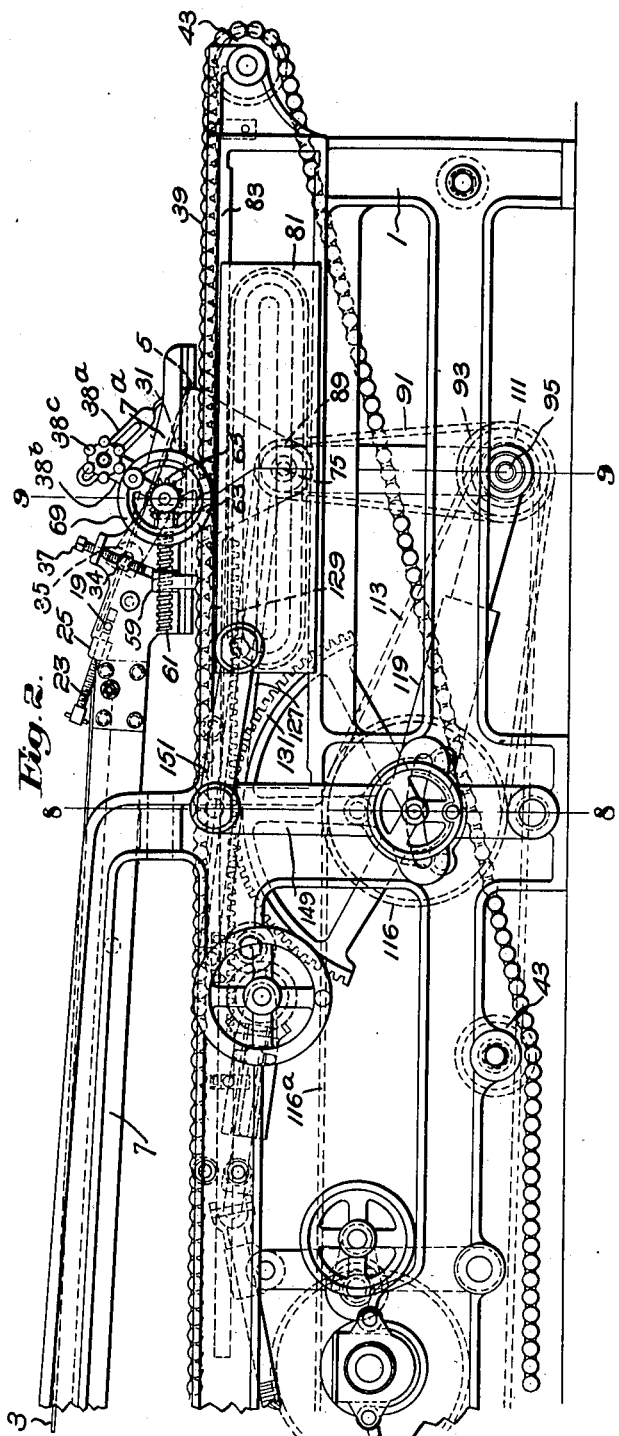

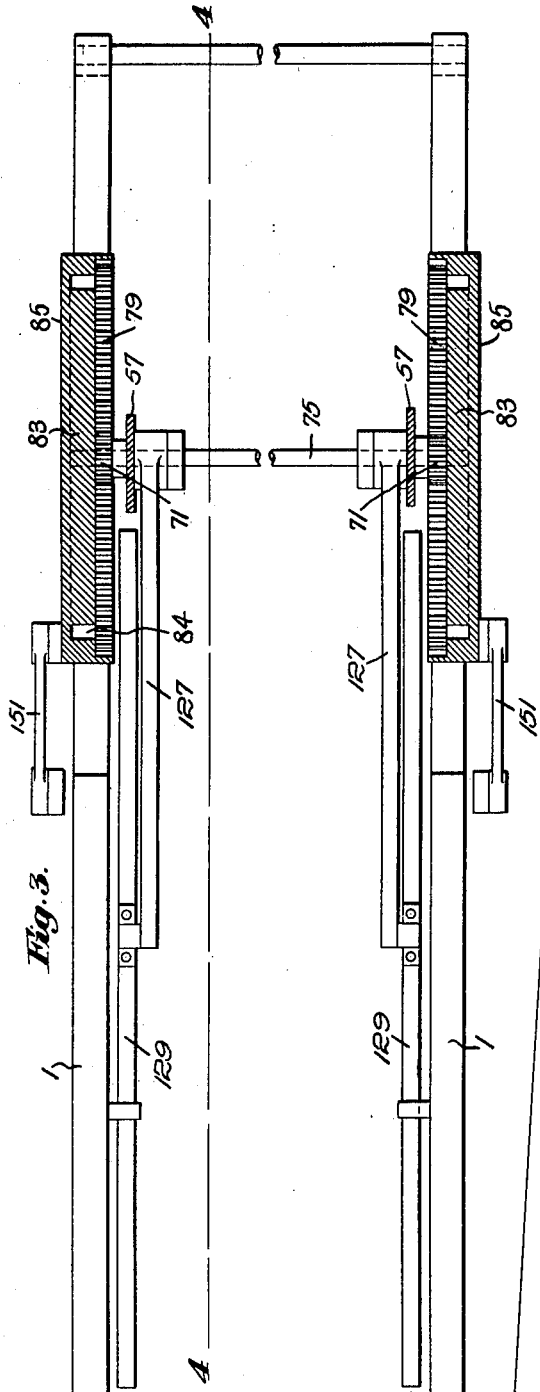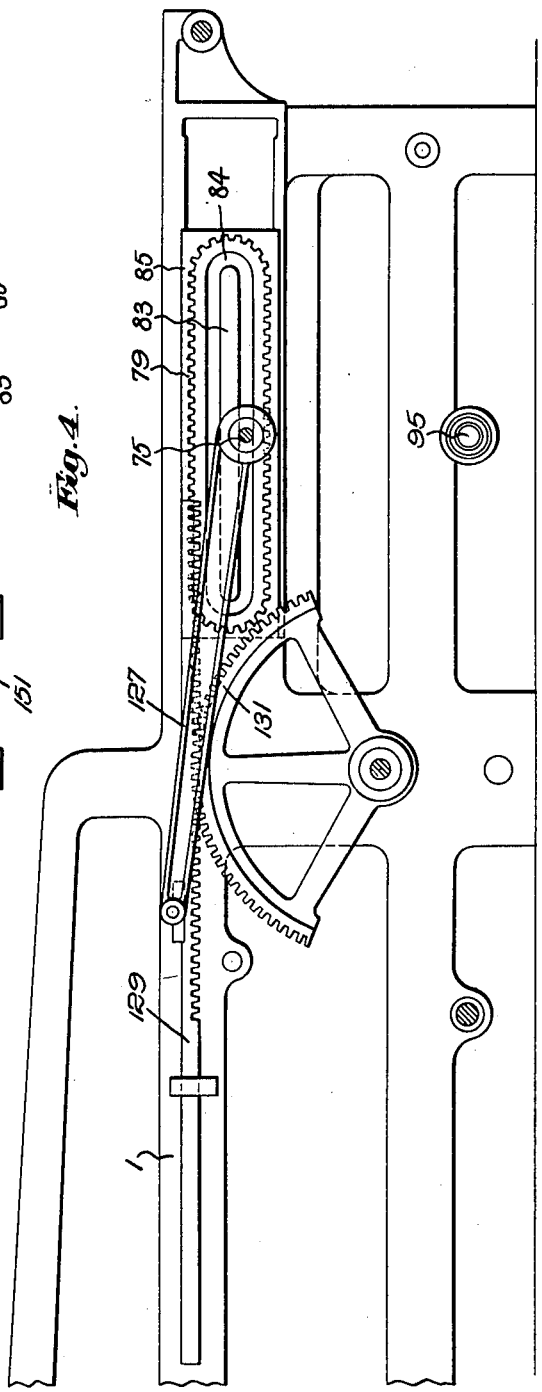

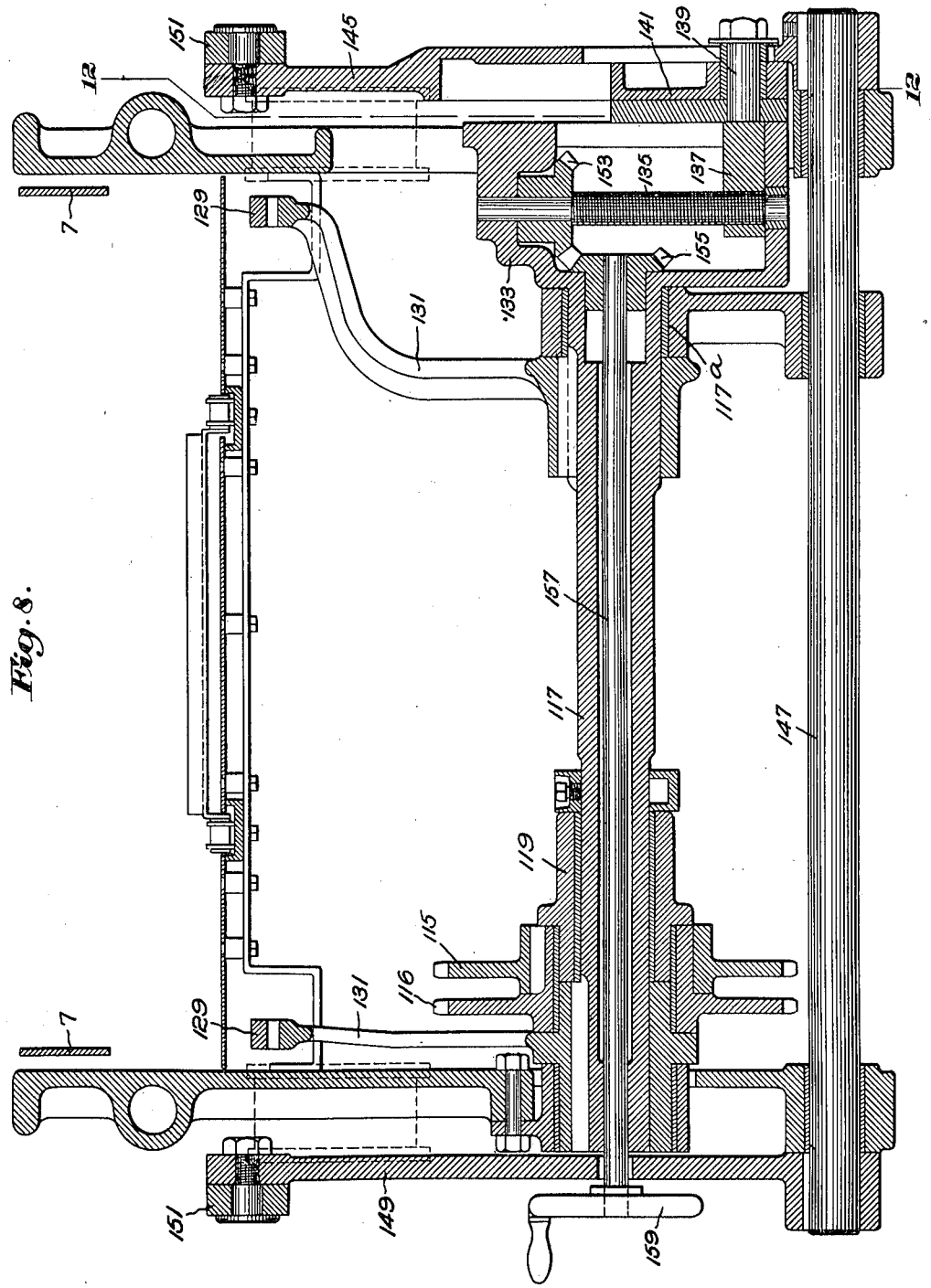

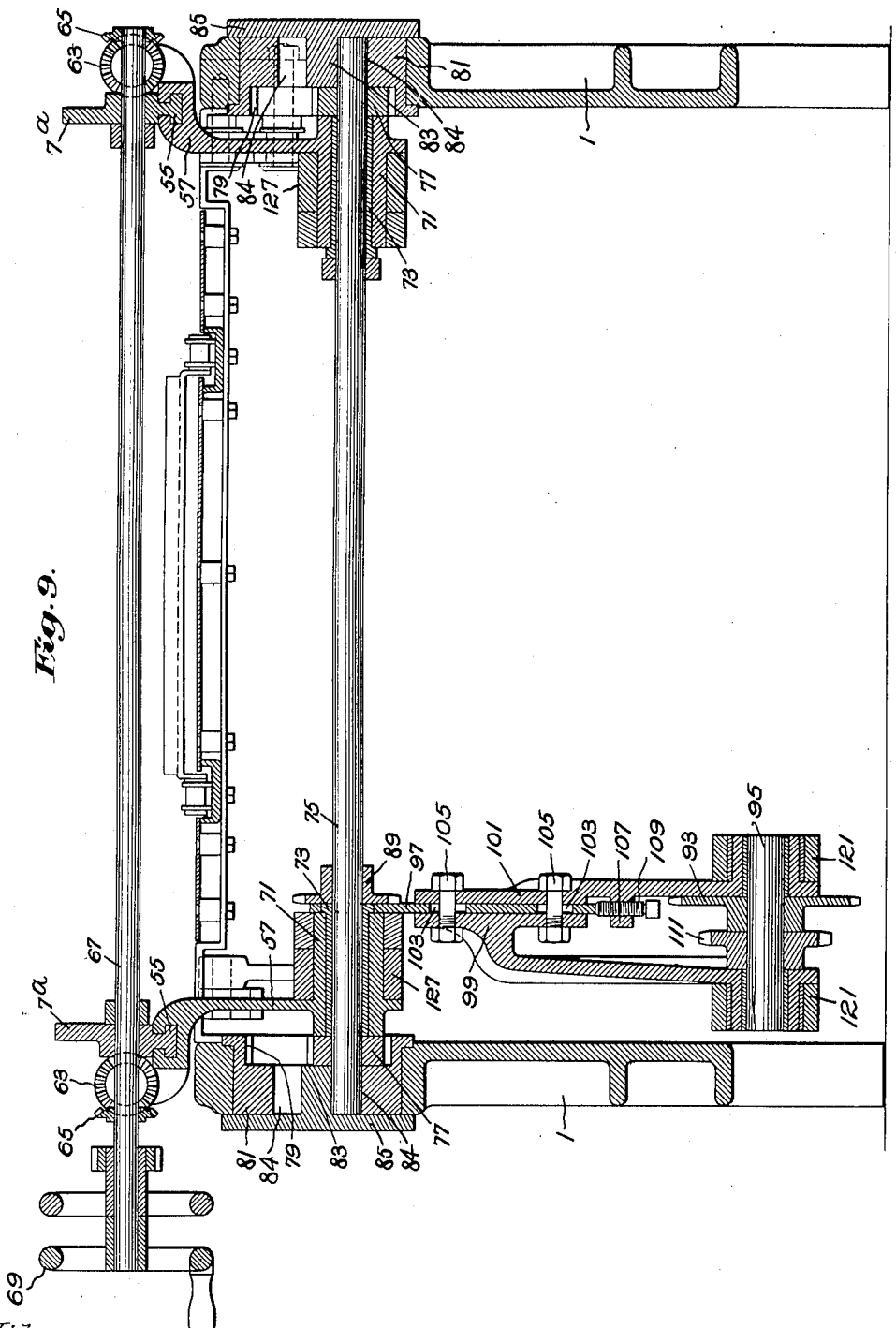

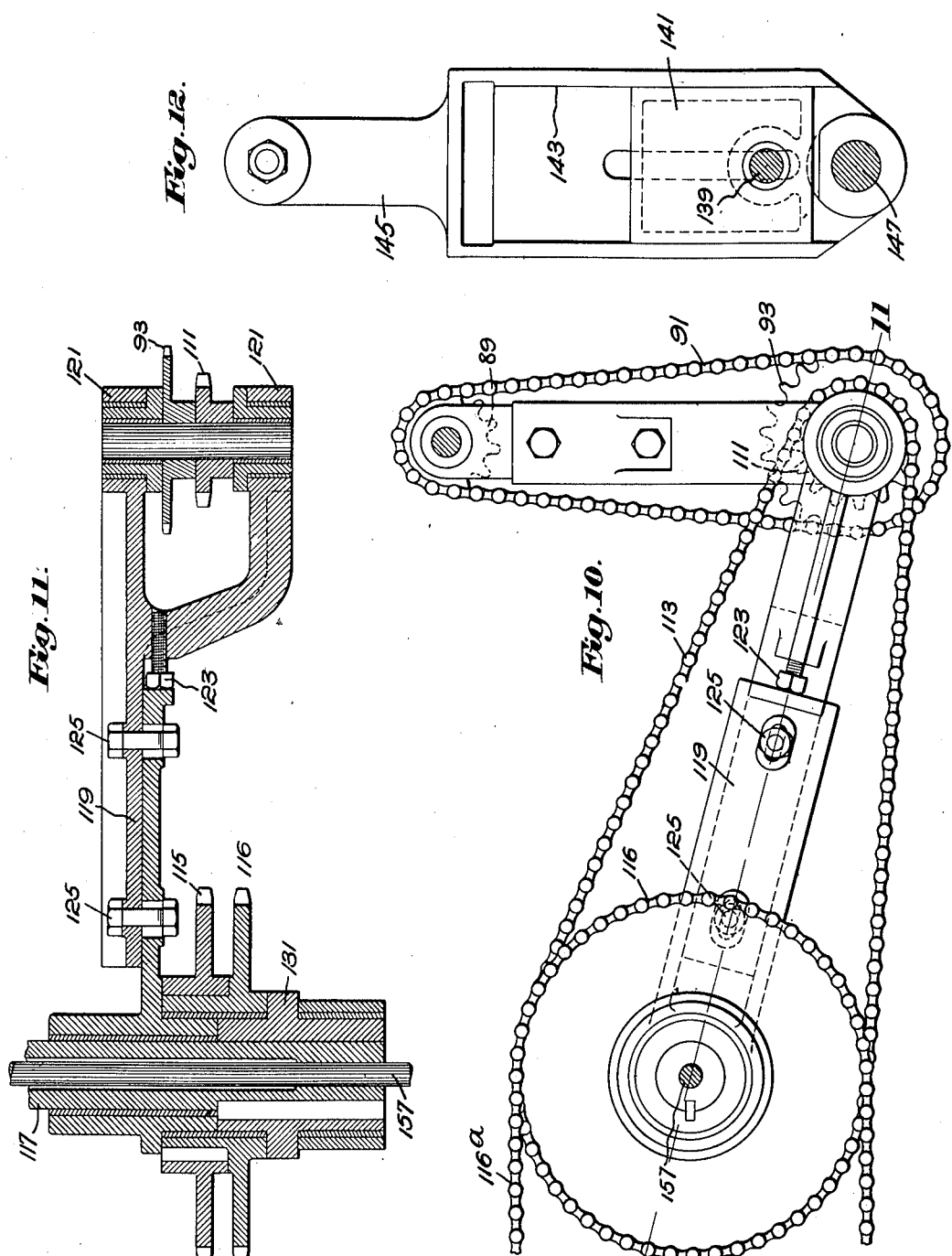

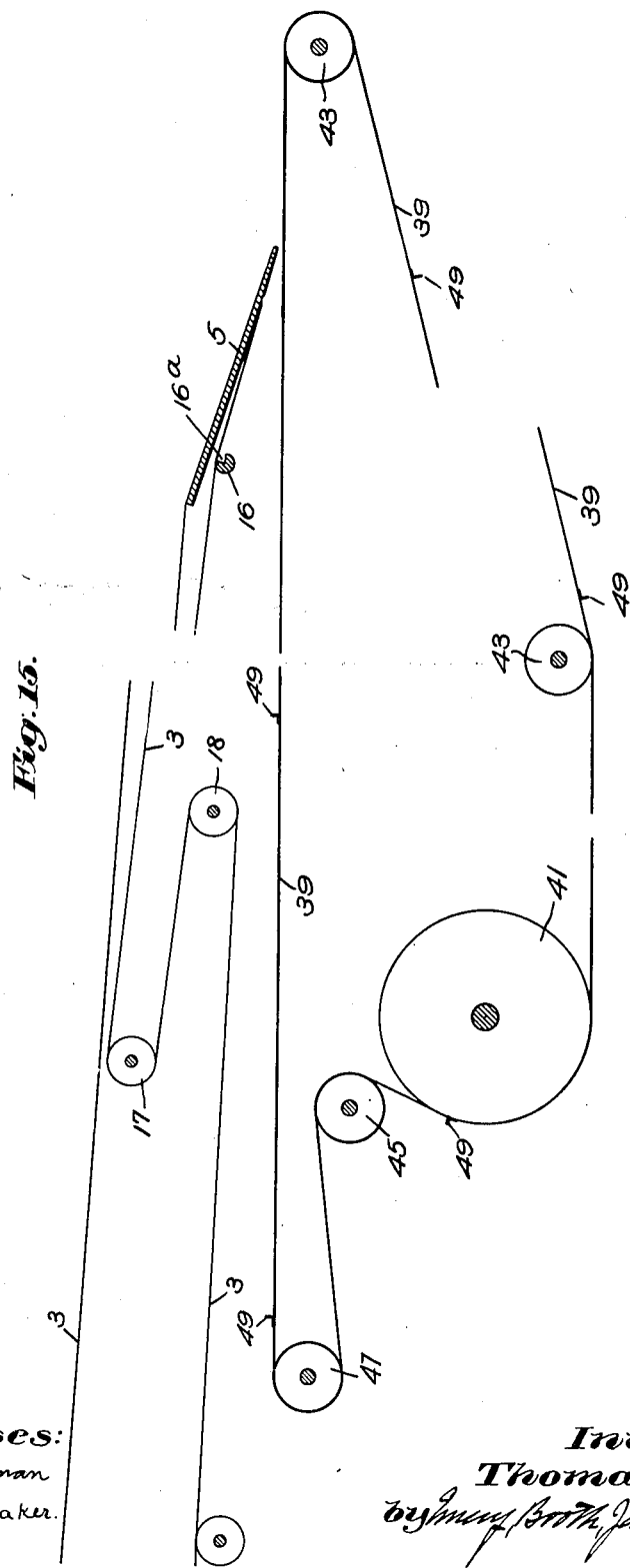

THOMAS L. GREEN, OF INDIANAPOLIS, INDIANA.

BISCUIT-CUTTING MACHINE.

1,291,844.  Specification of Letters Patent.  Patented Jan. 21, 1919.

Application filed March 12, 1915. Serial No. 13,973.

*To all whom it may concern:*

Be it known that I, THOMAS L. GREEN, a citizen of the United States, and a resident of Indianapolis, Indiana, have invented an Improvement in Biscuit-Cutting Machines, of which the following description, in connection with the accompanying drawings, is a specification, like characters on the drawings representing like parts.

This invention relates to biscuit-cutting machines and the like of the type shown in my co-pending application, Serial No. 858,507, filed August 25, 1914, and among other objects aims to provide an improved mechanism for delivering biscuits from one carrier to another.

The character of the invention will be best understood by reference to the following description of an illustrative embodiment thereof shown in the accompanying drawings, wherein:—

Figure 1 is a side elevation of a portion of the delivery end of an illustrative biscuit-cutting machine shown herein as embodying the invention;

Fig. 2 is a continuation of the side elevation shown in Fig. 1;

Fig. 3 is a view partially in plan and partially in horizontal section of a portion of the machine shown in Fig. 2;

Fig. 4 is a vertical, longitudinal section taken on line 4—4 of Fig. 3;

Fig. 5 is a plan of a portion of the machine leading up to the portion shown in Fig. 3;

Fig. 6 is a transverse section taken on line 6—6 of Fig. 5;

Fig. 7 is a transverse section taken on line 7—7 of Fig. 5;

Fig. 8, on an enlarged scale, is a transverse vertical section taken on line 8—8 of Fig. 2;

Fig. 9, on an enlarged scale, is a transverse vertical section taken on line 9—9 of Fig. 2;

Fig. 10, on an enlarged scale, is a side elevation of transmission elements in the drive to the panner blade reciprocating pinions;

Fig. 11 is a section taken on line 11—11 of Fig. 10;

Fig. 12 is a vertical section taken on line 12—12 of Fig. 8;

Fig. 13, on an enlarged scale, is a side elevation of a portion of the frame carrying the panner blade;

Fig. 14 is an end elevation of the construction shown in Fig. 13; and

Fig. 15 is a diagrammatic view of the apron and the pan carrier.

Referring to the drawings, the illustrative machine shown therein as embodying the invention comprises elongated side frames 1 supporting an apron 3 (Figs. 1 and 2), adapted to conduct a sheet of dough to a biscuit-cutting mechanism and to conduct the biscuits died out from said sheet to the delivery end of the machine. The biscuit-cutting mechanism may be similar to that shown in my said co-pending application and therefore it is unnecessary to snow the same herein.

The biscuits are delivered automatically by said apron to a peel or to pans fed beneath the delivery end of said apron by a pan carrier.

An important feature of the invention relates to the mechanism for automatically delivering the biscuits from the apron. To accomplish this the delivery end of the apron is provided with a guide member which is alternately advanced and retreated to withdraw the support from beneath a batch of biscuits adjacent the delivery end of the apron and deliver the same therefrom. This guide member is typified herein as a panner blade 5 (Figs. 2, 13 and 14) carried at the forward end of a frame comprising long side bars 7 adapted to receive both longitudinal reciprocation and a rocking movement. To this end the said bars are pivoted intermediate their ends on a shaft 9 (Fig. 5) provided at its ends with rollers 11 (Fig. 7) adapted to travel along channel tracks 13 mounted on the inner faces of the side frames of the machine. To counter-balance a mechanism to be described carried by the forward end of said tilting frame, the rear end of said frame is provided with a weight 15 (Fig. 5).

The apron is guided around the edge of the panner blade and passes thence rearward and upward over a fixed guide roller 16 (Figs. 13, 15) having a longitudinal groove 16ª therein presenting a sharp edge which will serve to scrape from the apron any residual dough adhering thereto after passing the panner blade. The apron is guided from this fixed roll over a guide roller 17 (Figs. 1, 5, 6 and 15) on a shaft journaled in bearings in boxes 17ᵃ (Figs. 1, 2, 3, 4, 5 and 6) adapted to slide along guideways 17ᵇ on the side frames 1.

The guide roller 17 is adapted to reciprocate with the panner blade and its frame in order to take up and let off the apron in accordance with the panner blade movements. To accomplish this the shaft of said roller 17 is connected by links 17ᶜ (Figs. 5, 6 and 7) with the shaft 9 referred to. The apron is conducted from the guide roller 17 forwardly about a roller 18 (Fig. 15) journaled in fixed bearings 18ᵃ (Fig. 1) in the side frames and thence rearwardly toward the feeding in end of the machine where it may be driven continuously by a mechanism similar to that shown in said application.

To permit the panner blade to be tilted manually upward away from the pan carrier to an inoperative position it may be pivotally mounted on journals 19 (Figs. 2 and 13) projecting from a bar 21 securely fastened to panner blade 5 controlled by an adjusting screw 23 threaded into a lug 25 projecting outwardly from the side member 7ᵃ of the panner blade carrying frame. By turning the screw 23 one end of the panner blade may be adjusted in different positions longitudinally of its supporting frame to maintain proper alinement of apron. To tilt the panner blade to different elevations as required, there may be provided levers 27 (Fig. 13) fast on a shaft 29 mounted in bearings on the side members 7 of the panner blade frame. These levers carry lugs 31 at their forward ends on which the panner blade rests. A lever 33 fast on said shaft 29 has a bifurcated end in which is pivotally mounted a block 34 guided in a slot 35 in one of the members 7ᵃ. A screw 37 is mounted in a lug on one of said members 7ᵃ and threaded into said block. By adjusting said screw the lever 33 may be tilted to set the panner blade at the angle desired.

To contribute to the positioning of the biscuits on the portion of the apron adjacent the panner blade there is provided a brush 38 (Fig. 13) carried by slotted arms 38ᵃ (Figs. 2 and 13) on a shaft supported in open bearings in brackets 38ᵇ (Figs. 2, 13 and 14) mounted on the panner blade. The arms are secured in different positions of adjustment by hand nuts 38ᶜ.

The pan carrier comprises sprocket chains 39 on driving sprocket wheels 41 (Fig. 1) and guiding sprocket wheels 43, 45 and 47 (Figs. 1 and 2), the wheels 47 being adjustable to take up and maintain the proper tension on the chains. To positively feed the pans with the chains, the latter are provided with lugs 49 at appropriate intervals corresponding to the length of the pans or peels.

The driving sprocket wheels 41 for the pan carrier may be driven at different speeds by a change speed mechanism contained in a casing 51 (Fig. 1) all substantially the same as disclosed in my said co-pending application.

To prevent the depositing of biscuits on the edges of adjacent pans, the pan carrier is driven more rapidly during the intervals when biscuits are not being deposited than when they are being deposited, by a differential gear mechanism 53 (Fig. 1) controlled by a cam and follower all substantially the same as in my said co-pending application.

As stated, the panner blade is alternately advanced and retreated to effect the delivery of biscuits from the main apron to a peel or to the pans on the pan carrier as desired. Next will be described the mechanism for accomplishing this.

The apron is fed forward continuously and therefore it is moving forward while the panner blade is retreated. If the latter is retreated at the same speed that the apron is fed forward but in an opposite direction, it is only necessary to retreat said blade a distance equal to one-half of the length of the batch of biscuits to be deposited, or, in other words, a distance equal to one-half of the length of the portion of a pan which is to receive the batch of biscuits.

When the panner blade is retreated to deposit biscuits it is lowered so that it moves closely adjacent to the top surface of the pans thereby to reduce the drop of the biscuits to a minimum and prevent mutilation thereof. When the batch has been deposited, however, the panner blade is elevated somewhat in order to avoid its striking the pan conveying lugs 49 (Fig. 1) and also to permit peels to be inserted from the delivery end of the machine to and beneath the panner blade.

The mechanism about to be described imparts both the horizontal and vertical reciprocatory movements to the panner blade.

The side bars of the tilting panner blade carrying frame are provided at their forward ends with T-shaped rails 55 (Figs. 9, 13 and 14) carrying grooved bracket plates 57. To adjust said rails relatively to said bracket plates the latter are provided with ears carrying bosses 59 (Fig. 2) in which are threaded screws 61 having on the forward ends thereof bevel gears 63 (Figs. 2 and 9) adapted to be turned by bevel gears 65 fast on a shaft 67 journaled in bearings in said tilting frame members 7ᵃ. Fast on one end of said shaft is a hand wheel 69.

The machine is adapted to die out biscuits of different sizes. Obviously there will be a smaller number of rows of large biscuits on the portion of the apron extending from the cutter to the delivery end of the apron than if smaller biscuits are thereon. It is important that when the panner blade is in its forward limit of reciprocation the row of biscuits adjacent the delivery edge thereof should be completely supported without any likelihood of portions thereof hanging over the edge of the panner blade to be subject to mutilation. By turning the hand wheel 69 the panner blade carrying frame may be adjusted longitudinally of the bracket plates 57 to locate the panner blade properly to provide a sufficient margin of supporting surface on the apron to prevent any possibility of the biscuits hanging over the same for any sizes and numbers of rows of biscuits.

The horizontal and vertical reciprocatory movements referred to are imparted to the panner blade frame through the bracket plates 57. To accomplish this said plates are provided with bosses 71 (Fig. 9), containing bushings 73 in which is journaled a shaft 75 having fast thereon pinions 77 adapted to travel around internal racks 79 in elongated boxes 81 adapted to be slid in guideways 83 (Fig. 2) carried by the side frames of the machine as more fully hereinafter described. The ends of the pinion shaft 75 project somewhat beyond the pinions and find guidance in elliptic-like slots 84 (Fig. 9) in said rack boxes formed by fins 83 projecting inwardly from plates 85.

When the pinions 77 are rotated, obviously they will travel in an elliptic-like orbit around the internal racks 79 and thereby impart horizontal and vertical reciprocatory movements to the panner blade carrying frame. To rotate the pinion shaft it is provided with a sprocket wheel 89 (Figs. 2, 9 and 10) fast thereon connected by a sprocket chain 91 with a sprocket wheel 93 fast on a stud shaft 95 journaled in bearings in an arm depending from and carried by the pinion shaft 75. This arm comprises a bar 97 apertured to receive said shaft and projecting between members 99 and 101 of said arm. To vary the effective length of the arm, the bar 97 has slots 103 receiving bolts 105 entered through registering apertures in the members 99 and 101. The member 101 has a lug 107 in which is threaded a screw 109 adapted to abut against the end of the bar 97 and thereby facilitate its adjustment.

To rotate the sprocket wheel 93 its shaft 95 is provided with a sprocket wheel 111 fast thereon, adapted to be driven by a sprocket chain 113 (Figs. 8 and 10) from a sprocket wheel 115 fast on the hub of a sprocket wheel 116 which is driven by a sprocket chain 116ᵃ from a suitable sprocket wheel 116ᵇ mounted on shaft 116ᶜ (Fig. 1).

To contribute to the support of the sprocket wheel 111 while permitting the horizontal and up-and-down movements of the rack pinions 77, there is provided an arm 119 (Figs. 10 and 11) with a bifurcated end formed to present bosses 121 mounted on bosses of the arm members 99 and 101 referred to. The arm 119 (Figs. 8, 10 and 11) may be made in two parts which may be relatively adjusted by a screw 123 and be held in different positions of adjustment by bolts 125 in a manner substantially similar to that described in connection with the arm depending from the pinion shaft 75 as described. By adjusting these arms the tension of the sprocket chains 91 and 113 may be regulated as required.

The two arms described form an elbow in the transmission from the hollow shaft 117 to the pinion shaft 75 and, obviously, permit the travel of the pinions in orbitlike paths in the internal racks.

By the driving mechanism described the pinions 77 will travel around said racks and alternately advance and retreat the panner blade frame and automatically deposit biscuits from the apron to the pans beneath the delivery end of said apron.

It is very important to be able to vary the length of retreat of the panner blade according to the character of product delivered. The length of this retreat should be sufficient to deposit a batch of biscuits on a pan with sufficient margins adjacent the edges of the pans and sufficient spaces between the rows of biscuits on the pan to prevent them from spreading and running together in baking. The total length of a batch of biscuits of one size may be different from the total length of a batch of biscuits of a different size thereby making it necessary when changing from one size to another to vary the length of retreat of the panner blade to deposit the number of rows which will utilize so far as possible the area of the surfaces of the pan. Furthermore, different lengths of pans are employed for different classes of work.

Next will be described a mechanism whereby the length of reciprocation of the panner blade may be readily varied according to the conditions as required. To accomplish this the rack boxes 81 for the pinions 77 may be given a reciprocatory movement. To accomplish this the pinion shaft 75 is connected by links 127 (Figs. 3, 4 and 9) with straight racks 129 adapted to slide in guideways on the side frames of the machine. These racks mesh with toothed segments 131 (Figs. 2 and 8) fast on the sleeve shaft 117 referred to. At one end of this sleeve shaft is a boxlike arm 133 (Fig. 8) in which is journaled a screw shaft 135 threaded to a nut 137 having a pin 139 projecting therefrom into a cross-head 141

(Figs. 8 and 12) adapted to slide in a guideway 143 radially in an arm 145 fast on one end of a rocker-shaft 147 journaled in bearings in the side frames of the machine. On the opposite end of said rocker-shaft is an arm 149 (Fig. 8). The upper ends of the arms 145 and 149 are connected by links 151 (Figs. 2, 3 and 8) with the rack boxes referred to.

When the pinion shaft 75 reciprocates, it will operate through the links 127 to reciprocate the racks 129. These, in turn, will rock the toothed segments 131 thereby rocking the shaft 117. This causes the box arm 133 to oscillate, this movement of oscillation being transmitted to the arm 145 through the cross-head 141. The rocking of the arms 145 and 149 through the links 151 reciprocates the rack boxes 81.

If said boxes are moved in the direction of the travel of the pinions 77, they will increase the length of the reciprocation of the panner blade. If, on the other hand, they are moved in the opposite direction to the travel of said pinions, they will shorten the length of reciprocation of the panner blade.

In order that the extent of movement of the boxes 81 may be varied, the cross-head nut 137 is adapted to be adjusted along the screw shaft 135. To accomplish this, said shaft is provided with a bevel pinion 153 (Fig. 8) fast thereon meshing with a similar pinion 155 fast on a shaft 157 journaled within the hollow shaft 117 referred to. The shaft 157 projects slightly beyond said hollow shaft to receive a hand wheel 159.

By turning said hand wheel the shaft 157 and bevel gears 155 and 153 will rotate and turn the screw shaft 135 and move the nut 137 transversely to the axial line of said shaft 157 and radially of the rocker arm 145. If the nut is adjusted to a position in registration with the axial line of said shaft, then no movement will be imparted to the rocker arms 145 and 149 and the rack boxes 181 will remain stationary. If, however, the nut is adjusted downwardly from the axial line of said shaft, the arms 145 and 149 will be rocked in an opposite direction to the movement of the toothed segments 131, and the rack boxes 81 will be moved in an opposite direction to the travel of the pinions 77, thereby reducing the length of reciprocation of the panner blade. If the nut 137 is adjusted above the axial line of the shaft 157, the rack boxes will be caused to travel in the same direction as the pinions 77 and thereby will increase the length of reciprocation of the panner blade. It will be apparent that by variously adjusting the nut 137 any desired degree of movement of the boxes 81 may be obtained and the length of the panner blade reciprocation may be varied as desired.

The actuating mechanism for reciprocating the panner blade is located advantageously near said panner blade, thereby providing a desirable positive and convenient control over the same. While the weight of the transmission mechanism for the rack pinions 77 is carried substantially by the panner blade frame, yet the up-and-down and horizontal reciprocations thereof are readily effected because of the counter-balancing of this mechanism by the weight 15 referred to.

The hand wheels for effecting the various adjustments described are located on the same side of the machine and adjacent the delivery end thereof where they are conveniently accessible for operation. It will be observed the hand wheel for controlling the rack box adjustment is a shaft within the hollow shaft 117. Therefore its axis remains stationary while the arms 145 and 149 are rocking. Consequently said hand wheel may readily and conveniently be turned while the machine is in operation to adjust the length of retreat of the panner blade to conform to the length of peel or pan beneath it with a highly desirable nicety of adjustment.

While the invention is described in connection with a machine for handling biscuits, it will be understood that its field of use is not limited thereto. Having described one illustrative embodiment of the invention without limiting the same thereto, what I claim as new and desire to secure by Letters Patent is:

1. The combination of a continuously fed apron with a guide member for the delivery end of said apron, driving means, and mechanism driven thereby having means in addition to said driving means automatically, alternately to advance and retreat said member to deposit articles from said apron to pans or peels on a carrier, said mechanism having means for varying the extent of the depositing movement of said member to conform to pans or peels of different lengths on said carrier.

2. The combination of a continuously fed apron with a guide member for the delivery end of said apron, driving means and mechanism driven thereby having means in addition to said driving means alternately to advance and retreat said member to discharge articles from said apron, said mechanism including means for varying the extent of the discharge movement of said member.

3. The combination of an apron with a guide member for the delivery end of said apron and means alternately to advance and retreat said member to discharge articles from said apron, said means including a rack and pinion, means to cause said pinion to travel along said rack and means to move said rack concurrently with the travel of the pinion to vary the effective extent of travel of said pinion.

4. The combination of an apron with a guide member for the delivery end thereof and mechanism alternately to advance and retreat said member including rack and pinion means and automatic means to impart movement to said rack concurrently with the travel of the pinion to vary the effective extent of travel of said pinion.

5. The combination of an apron with a guide member for the delivery end thereof and means to impart a reciprocating article-depositing movement to said member including a box rack, a pinion connected to said member adapted to travel along said rack, a support for said rack and means to slide the latter along said support concurrently with the travel of the pinion to vary the extent of movement of said pinion.

6. The combination of an apron with a guide member for the delivery end thereof and means to impart a reciprocating article-depositing movement to said member including a rack, a gear adapted to travel along said rack, a rack bar, a link connecting said gear with said rack bar, a toothed segment in mesh with said rack bar, a shaft for said segment, a rocker-shaft, an arm thereon, a link connecting said rocker-shaft to said gear rack and means connecting said segment shaft with said arm adjustable for varying the extent of movement of said arm.

7. The combination of a frame with an apron, guiding means therefor including a member at the delivery end of said apron, and means to impart an article-discharging reciprocating movement to said member including rack boxes adapted to slide on said frame, gears meshing with the racks of said boxes, a shaft for said gears, means connecting said shaft with said member, means for causing said gears to travel along said racks, and means to slide said boxes along said frame including rack bars, toothed segments meshing therewith, links connecting said gear shaft with said bars, a shaft for said segments, a rocker shaft arms thereon, links connecting said arms with said rocker boxes and means connecting said segment shaft with one of said arms and having adjustable means for varying the rocking movement of said arms.

8. The combination of a frame with an apron, guiding means therefor including a longitudinally movable frame carrying a guide member for the delivery end of said apron and means for reciprocating said frame and member to discharge articles from said apron including rack and pinion means, means for driving said pinion and means for moving said rack concurrently with the travel of the pinion to vary the extent of movement of said pinion.

9. The combination of an apron with a guide member for the delivery end thereof, a frame carrying said member and means automatically to impart forward and back and up and down movements to said frame including means for varying the extent of the forward and back movement.

10. The combination of an apron, a guide member for the delivery end of said apron, a support for said member, driving means for alternately advancing and retreating said member and means for counter-balancing the weight of said driving means.

11. The combination of an apron with a guide member for the delivery end thereof, a tilting frame carrying said member, means for alternately advancing and retreating said frame and imparting an up and down movement thereto including driving means carried by said frame and means on said frame for counter-balancing the weight of said driving means.

12. The combination of an apron with a guide member for the delivery end thereof, a tilting frame carrying said member and means alternately to advance and retreat said frame including a rack, a pinion coöperating with said rack, driving means for said pinion, means supporting said pinion and its driving means from said frame adjacent the end of said frame carrying said guide member and means adjacent the opposite end of said frame for counter-balancing the weight of said driving means.

13. The combination of an apron with a guide member for the delivery end thereof, a frame carrying said member having rails adjacent the delivery end thereof, bracket plates depending from said rails, means for adjusting said rails and frame relatively to said bracket plates for varying the position of said guide member, a shaft journaled in said plates, gears fast on said shaft, racks meshing with said gears, means for driving said gears to move the same along said racks and means for moving said racks concurrently with the travel of the gears to vary the extent of travel of said gears.

14. The combination of an apron with a guide member for the delivery end thereof, means carrying said member, operating mechanical means alternately to advance and retreat said member and means automatically alternately to raise and lower said member bodily, and means for adjusting said supporting means relatively to said operating mechanical means to vary the position of said member.

15. The combination of an apron with a member for guiding the delivery end thereof, a carrier for said member having rails thereon, means for alternately advancing and retreating said rails and member including rack and pinion means, supports for said pinion means carried by said rails and means for adjusting said guide member carrier relatively to said pinion supports.

16. The combination of an apron with a guide member for the delivery end thereof, a frame carrying said member, rack and pinion means for reciprocating said frame, means connecting said pinion means with said frame and means for relatively adjusting said connecting means and frame.

17. The combination of an apron with a guide member for the delivery end thereof, a frame carrying said member, a shaft journaled on said frame, supporting members adapted to slide along said frame, screws connecting said members and said frame and gears for imparting rotation from said shaft to said screws to slide said members relatively to said frame, a shaft journaled in said members, gears on said shaft, internal racks meshing with said gears and means for causing said gears to travel along said racks to impart the reciprocating movements to said frame and guide member.

18. The combination of an apron with a guide member for the delivery end thereof and means for reciprocating said member to discharge articles from said apron including rack and pinion means, driving means for said pinion means and means operated by said pinion means for reciprocating said rack means and having provision for varying the length of reciprocation for said rack means.

19. The combination of a pan carrier with an apron, a guide for the delivery end of said apron, means to reciprocate said guide to deposit articles on said carrier, said means having provision for varying the extent of the reciprocation of said guide and means for varying the location of the forward limit of reciprocation of said member, and means automatically and bodily to move said guide up and down at the limits of its reciprocation.

20. The combination of an apron with a guide member for the delivery end thereof and means applied directly to said member for imparting horizontal reciprocation to said member and having provision for automatically imparting a downward bodily movement thereto at the forward limit of its reciprocation and an upward bodily movement thereto at the rearward limit of its reciprocation.

21. The combination with an apron of a guide member for the delivery end thereof and rack and pinion means applied to said member at the delivery end of said apron for alternately advancing and retreating said member and imparting a downward bodily movement at the forward limit of movement of said member and an upward bodily movement to said member at the rearward limit of its movement.

22. The combination of an apron with a guide member at the delivery end thereof, a frame carrying said member, mechanism adjacent the forward end of said frame for alternately advancing and retreating said member to deposit articles from said apron, and a counter-balance weight connected to said frame and adapted to counterbalance the weight of the mechanism at the forward end of the frame.

23. The combination of a main frame with an apron, guiding means for said apron including a member adjacent the forward end thereof, a frame carrying said member, a shaft for said frame, rollers on said shaft, tracks on said main frame receiving said rollers, mechanism adjacent the forward end of said frame for alternately advancing and retreating the same to deposit articles from the apron and a weight adjacent the opposite end of said frame for counterbalancing said mechanism.

24. The combination of a main frame with an apron, guiding means for said apron including a member adjacent the delivery end of said apron, a frame carrying said member, a shaft intermediate the ends of said frame, rollers on said shaft, tracks on said main frame for said rollers, said frame adapted to tilt on said shaft a take-up roll, a shaft therefor, journal boxes for said shaft, guide means on said main frame for said journal boxes, and links connecting said take-up roll with said roller shaft whereby said frame and take-up roll can be moved simultaneously.

25. The combination of an endless apron adapted to carry dough through a cutting mechanism and means for alternately shortening and lengthening its delivery end for depositing purposes comprising a movable guide member for said delivery end and a take-up roll, a frame carrying said guide member, track and roller means permitting a longitudinal and tilting movement of said frame, and means connecting said frame with said take-up roller to cause the latter to retreat and advance with said guide member.

26. The combination of an apron with means alternately to advance and retreat the delivery end thereof to deposit articles therefrom comprising, rack and pinion means, rocker means, link means connecting said rocker means with said rack means and means connecting said pinion means with said rocker means including means for varying the extent of oscillation of said rocker means.

27. The combination of an apron with means alternately to shorten and lengthen the delivery end thereof to deposit articles therefrom comprising, internal racks, pinions therefor, rack bars connected to said pinions, toothed segments meshing with said rack bars, a shaft for said toothed segments, rocker arms, a shaft therefor, an arm on said segment shaft having an element connected to one of said rocker arms and means for adjusting said element radially along the arms connected thereby and means connecting said rocker arms with said internal racks.

28. The combination of an apron with means to impart to the delivery end thereof a reciprocation movement of varying extent comprising, internal racks, pinions thereon, sliding rack bars connected to said pinions, toothed segments meshing with said rack bars, a hollow shaft for said toothed segments, rocker arms, links connecting said rocker arms with said internal racks, a shaft for said rocker arms, an arm fast on said hollow shaft, an element connecting the latter arm with one of said rocker arms and means to adjust said element radially of said arms to vary the throw of said rocker arms including a shaft in said hollow shaft and a hand wheel for turning the same.

29. The combination of an apron with means alternately to advance and retreat the delivery end thereof for depositing articles comprising a rack, a pinion, means to cause said pinion to travel along said rack and means for transmitting movement from said pinion to said rack including manually adjustable means for varying the length of movement of said rack.

30. The combination of an apron with means for alternately advancing and retreating the delivery end thereof to deposit articles comprising, a rack, a pinion, means to cause said pinion to travel along said rack and means for imparting movement from said pinion to said rack including arms, an element connecting said arms and means for adjusting said element radially of said arms.

31. The combination of an apron with means for alternately advancing and retreating the delivery end thereof to deposit articles comprising, a rack a pinion, means to cause said pinion to travel along said rack and means for imparting movement from said pinion to said rack including arms, an element connecting said arms and screw means to adjust said element radially of said arms.

32. The combination of an apron with means for alternately advancing and retreating the delivery end thereof to deposit articles comprising, a rack, a pinion, means to cause said pinion to travel along said rack and means for imparting movement from said pinion to said rack including arms, an element connecting said arms, a screw carrying said element and gear means for turning said screw to move said element radially of said arms.

33. The combination of an apron with means for alternately advancing and retreating the delivery end thereof to deposit articles comprising, a rack, a pinion, means to cause said pinion to travel along said rack and means for imparting movement from said pinion to said rack including arms, an element connecting said arms, a screw receiving said element journaled in one of said arms, a shaft, gears for transmitting movement from said shaft to said screw and a hand wheel for turning said shaft.

34. The combination of an apron with means alternately to shorten and lengthen the delivery end thereof to deposit articles therefrom comprising, a rack, a pinion, means to cause said pinion to travel along said rack and means for causing said rack to move in the same direction as said pinion or in the opposite direction from said pinion and concurrently with the travel of the pinion to vary the effective extent of travel of said pinion.

35. The combination of an apron with means alternately to shorten and lengthen the delivery end thereof to deposit articles therefrom comprising, a rack, a pinion, and means to impart movement from said pinion to said rack including oppositely rocking arms and adjustable means connecting said arms for varying the throw of one of them.

36. The combination of a continuously fed apron with a guide member for the delivery end thereof and mechanism alternately to advance and retreat said member including manually controlled means readily operable and accessible while the machine is in motion, for varying the extent of movement of said member while the latter is in motion.

37. The combination of an apron with a guide member for the delivery end thereof and mechanism alternately to advance and retreat said member including an axially stationary shaft and manually controlled means adjustable to vary the extent of the retreat of said member.

38. The combination with an apron, of a guide therefor, and means for reciprocating said guide to deposit articles from said apron, including a rack, a gear, and means automatically to impart concurrent movements of translation to said rack and gear.

39. The combination with an apron, of a guide therefor, and means for reciprocating said guide to deposit articles from said apron, including a rack and gear, and means automatically to impart concurrent movements of translation to said rack and gear, said rack having provision for automatically reversing the direction of travel of said gear.

40. The combination with an apron, of a guide therefor, and means for reciprocating said guide to deposit articles from said apron, including a rack and gear, said rack having provision for automatically causing said gear to travel forward and back and up and down, and means automatically to reciprocate said rack.

41. The combination with an apron 3, of a guide 5 therefor, and means for reciprocating said guide, including a gear 77, a rack 79, means to rotate said gear to cause the same to travel along said rack, and means including elements 127, 129, 131, 145 and 151 actuated from said gear for moving said rack concurrently therewith.

42. The combination with an apron 3, of a guide 5 therefor, and means for reciprocating said guide, including a gear 77, a rack 79, means to rotate said gear to cause the same to travel along said rack, means including elements 127, 129, 131, 145 and 151 actuated from said gear for concurrently moving said rack, and adjustable means including elements 135, 137, 153, 155, 157 and 159 to vary the extent of movement of said rack.

43. The combination with an apron 3, of a movably supported guide 5 therefor, mechanism carried by said guide to adjust and reciprocate the same, and means 15 to counterbalance said mechanism.

44. The combination of an apron with a guide-member for the delivery end thereof and means for reciprocating said member to discharge articles from said apron including rack and pinion means, driving means therefor, and means operated by said pinion means for reciprocating said rack means.

45. The combination of an apron, the delivery end of which is alternately retreated and advanced for depositing articles, and moved up and down at the limits of its backward and forward reciprocations, a movable guide therefor, a longitudinally reciprocating and tilting frame supporting said guide, and a take-up roller movable longitudinally with said frame.

46. The combination with an apron, of a movable guide for its delivery end, and mechanism for moving the same backward and forward including a rotating gear carried by said guide traveling in an orbit-like path.

47. The combination with an apron, of a movable guide for its delivery end, mechanism for moving the same backward and forward including a rotating gear carried by said guide traveling in an orbit-like path, a primary drive shaft, and transmission means between said shaft and rotating traveling gear including sprocket and chain gearing arranged to provide a flexible elbow.

48. The combination with an apron, of a movable guide for its delivery end, mechanism for moving the same backward and forward including a rotating gear carried by said guide traveling in an orbit-like path, and manually controlled means operable during the motion of said mechanism for adjusting the effective extent of travel of said gear.

49. The combination with an apron, the delivery end of which is alternately retreated and advanced for depositing articles, of a movable guide therefor, operating mechanism for reciprocating said guide, and manually controlled means operable during the motion of said mechanism for adjusting the extent of movement of said guide including a transverse adjusting shaft and mechanism controlled by said shaft for varying the operation of said mechanism.

50. The combination with an apron, of a movable guide therefor, operating mechanism for moving said guide backward and forward including a rotating gear carried by said guide and a rack on which the gear travels in an orbit-like path, and means actuated by said gear for concurrently shifting said rack including means for varying the movement thereof as desired.

51. The combination of an apron, operating mechanism for alternately retreating and advancing its delivery end, and adjusting mechanism controlling said operating mechanism to vary the extent of forward and backward movement of said delivery end, said adjusting mechanism including an adjusting shaft, a rocker coaxial therewith, another rocker pivoted eccentrically to said shaft, and means controlled by said shaft adjustably connecting said rockers.

In testimony whereof I have signed my name to this specification in the presence of two subscribing witnesses.

THOMAS L. GREEN.

Witnesses:
LEOX SMITH,
JAMES W. NOEL.